US011405197B2

(12) United States Patent
Lenglet et al.

(10) Patent No.: US 11,405,197 B2
(45) Date of Patent: Aug. 2, 2022

(54) SECURITY TOKEN EXPIRATION USING SIGNING KEY ROTATION

(71) Applicant: Google LLC, Mountain View, CA (US)

(72) Inventors: Romain Lenglet, Mountain View, CA (US); Erik David Gustavson, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/894,941

(22) Filed: Jun. 8, 2020

(65) Prior Publication Data

US 2021/0385083 A1 Dec. 9, 2021

(51) Int. Cl.
*H04L 9/08* (2006.01)
*H04L 9/32* (2006.01)
*G06F 9/54* (2006.01)

(52) U.S. Cl.
CPC ............ *H04L 9/0891* (2013.01); *G06F 9/547* (2013.01); *H04L 9/088* (2013.01); *H04L 9/0894* (2013.01); *H04L 9/3213* (2013.01)

(58) Field of Classification Search
CPC ..... H04L 9/0891; H04L 9/088; H04L 9/0894; H04L 9/3213; G06F 9/547
USPC ........................................................ 380/277
See application file for complete search history.

(56) References Cited

U.S. PATENT DOCUMENTS

| 9,917,694 | B1 | 3/2018 | Juels et al. | |
|---|---|---|---|---|
| 10,664,451 | B1* | 5/2020 | Liao | H04L 9/0891 |
| 2014/0129838 | A1* | 5/2014 | Kim | H04L 63/0807 713/171 |
| 2015/0222435 | A1 | 8/2015 | Lea | |
| 2017/0141926 | A1* | 5/2017 | Xu | H04L 9/3263 |

FOREIGN PATENT DOCUMENTS

CN 101132694 A 2/2008

OTHER PUBLICATIONS

International Search Report and Written Opinion for the related Application No. PCT/US2020/065249 dated Dec. 16, 2020, 12 pages.

* cited by examiner

*Primary Examiner* — Noura Zoubair
*Assistant Examiner* — Phuc Pham
(74) *Attorney, Agent, or Firm* — Honigman LLP; Brett A. Krueger

(57) ABSTRACT

A method for expiring tokens includes obtaining a list of valid key identifications (IDs) for at least one valid cryptographic key configured to sign authentication tokens. The method also includes receiving an authentication token from a client authenticating and authorizing the client to access a resource and comprising an ID of a cryptographic key used to sign the authentication token. The method also includes determining whether the cryptographic key used to sign the authentication token is valid based on the list of valid key IDs for the at least one valid cryptographic key. When the cryptographic key used to sign the authentication token is valid, the method includes allowing the client access to the resource.

20 Claims, 6 Drawing Sheets

SECURITY TOKEN EXPIRATION USING SIGNING KEY ROTATION

TECHNICAL FIELD

This disclosure relates to security token expiration using signing key rotation.

BACKGROUND

Authentication tokens (i.e., security tokens) are increasingly used to allow clients access to restricted resources. Typically, a client provides authentication credentials to a token issuer, and after the token issuer authenticates the client, the token issuer issues the client an authentication token. The client may submit this authentication token to the server or other entity controlling access to the resource. After the server verifies the authenticity of the authentication token, the server may allow the client to access the resource. Because tokens are generally stateless, the server does not need to store a session state. Moreover, token generation and token verification can be decoupled and provide fine-grained access control. However, when there is a large number of clients and servers, scalability can become an issue.

SUMMARY

One aspect of the disclosure provides a method for expiring authentication tokens using signing key rotation. The method includes obtaining, at data processing hardware, a list of valid key identifications (IDs) for at least one valid cryptographic key configured to sign authentication tokens. The method also includes receiving, at the data processing hardware, an authentication token from a client. The authentication token authenticates and authorizes the client to access a resource associated with the data processing hardware and includes an ID of a cryptographic key used to sign the authentication token. The method also includes determining, by the data processing hardware, whether the cryptographic key used to sign the authentication token is valid based on the list of valid key IDs for the at least one valid cryptographic key. When the cryptographic key used to sign the authentication token is valid, the method includes allowing, by the data processing hardware, the client access to the resource.

Implementations of the disclosure may include one or more of the following optional features. In some implementations, obtaining the valid list of key IDs for the at least one valid cryptographic key includes receiving a list of key ID for at least one potentially valid cryptographic key. Each key ID in the list of key IDs for the at least one potentially valid cryptographic key is associated with a respective expiration time. For each key ID in the list of key IDs for the at least one potentially valid cryptographic key, the method may include determining whether the expiration time associated with the respective key ID has expired, and when the expiration time associated with the respective key ID has not expired, determining that the respective key ID is valid.

In some examples, obtaining the list of valid key IDs for the at least one valid cryptographic key includes receiving an update from an issuer of the cryptographic keys. The update may include a remote procedure call (RPC). The update may include a publish-subscribe protocol. Optionally, each key ID includes an encoding of an integer. Each integer may include a size of one byte.

The method, in some implementations, includes receiving, at the data processing hardware, a list of invalid key IDs for at least one invalidated cryptographic key. For each invalid key ID in the list of invalid key IDs for the at least one invalidated cryptographic key, the method may include removing, by the data processing hardware, a corresponding valid key ID from the list of valid key IDs for the at least one valid cryptographic key. In some examples, the method includes obtaining, at the data processing hardware, an updated list of valid key IDs for at least one valid cryptographic key. Each key ID in the updated list of valid key IDs different than each key ID in the list of valid key IDs. Optionally, the authentication token does not include a timestamp.

Another aspect of the disclosure provides a system for expiring authentication tokens using signing key rotation. The system includes data processing hardware and memory hardware in communication with the data processing hardware. The memory hardware stores instructions that when executed on the data processing hardware cause the data processing hardware to perform operations. The operations comprise obtaining a list of valid key identifications (IDs) for at least one valid cryptographic key configured to sign authentication tokens. The operations also include receiving an authentication token from a client. The authentication token authenticates and authorizes the client to access a resource associated with the data processing hardware and includes an ID of a cryptographic key used to sign the authentication token. The operations also include determining whether the cryptographic key used to sign the authentication token is valid based on the list of valid key IDs for the at least one valid cryptographic key. When the cryptographic key used to sign the authentication token is valid, the operations include allowing the client access to the resource This aspect may include one or more of the following optional features. In some implementations, obtaining the valid list of key IDs for the at least one valid cryptographic key includes receiving a list of key ID for at least one potentially valid cryptographic key. Each key ID in the list of key IDs for the at least one potentially valid cryptographic key is associated with a respective expiration time. For each key ID in the list of key IDs for the at least one potentially valid cryptographic key, the operations may include determining whether the expiration time associated with the respective key ID has expired, and when the expiration time associated with the respective key ID has not expired, determining that the respective key ID is valid.

In some examples, obtaining the list of valid key IDs for the at least one valid cryptographic key includes receiving an update from an issuer of the cryptographic keys. The update may include a remote procedure call (RPC). The update may include a publish-subscribe protocol. Optionally, each key ID includes an encoding of an integer. Each integer may include a size of one byte.

The operations, in some implementations, include receiving a list of invalid key IDs for at least one invalidated cryptographic key. For each invalid key ID in the list of invalid key IDs for the at least one invalidated cryptographic key, the operations may include removing a corresponding valid key ID from the list of valid key IDs for the at least one valid cryptographic key. In some examples, the operations include obtaining an updated list of valid key IDs for at least one valid cryptographic key. Each key ID in the updated list of valid key IDs different than each key ID in the list of valid key IDs. Optionally, the authentication token does not include a timestamp.

The details of one or more implementations of the disclosure are set forth in the accompanying drawings and the

DESCRIPTION OF DRAWINGS

Like reference symbols in the various drawings indicate like elements.

DETAILED DESCRIPTION

Authentication tokens (i.e., security tokens) are commonly used to authenticate clients for access to resources. For example, JavaScript Object Notation (JSON) Web Token is an Internet standard for creating access tokens. One of these access tokens is typically sent with every web request to authenticate the client end-user. In order to mitigate credential exfiltration (i.e., the impact of an attacker gaining access to an authentication token), every token has a limited lifespan. Generally, the shorter the lifespan of the token, the greater the security. However, conventional techniques implement this lifespan through the use of an expiration timestamp included within each token. That is, each token includes a timestamp that indicates when the token expires. When authenticating such a token, the server compares the expiration timestamp to the current time to determine if the authentication is still valid. This requirement causes inefficiencies, especially at greater scales.

For example, every token must include the expiration timestamp. Typically, this timestamp is a 32-bit unsigned integer encoding the number of seconds since the Epoch. Timestamp validation generally cannot be implemented in network processors and/or other dedicated hardware such as application specific integrated circuits (ASICs). Thus, the timestamps prevents using security tokens in lower networking layers and implementing token validation in hardware.

Implementations herein are directed toward a token authentication system that does not rely on per-token timestamps to limit the lifespan of authentication tokens. Instead, a token issuer of the system signs each token with a cryptographic key and includes in each token an identification (ID) of the cryptographic key used to sign the respective token. A token authenticator of the token authentication system obtains a list of key IDs indicating which cryptographic keys are currently valid. After receiving an authentication token from a client requesting access to a resource, the token authenticator determines whether the cryptographic key used to sign the authentication token is valid based on the list of key IDs. When the cryptographic key used to sign the authentication token is valid, the token authenticator allows the client to access the resource.

Figure 1:
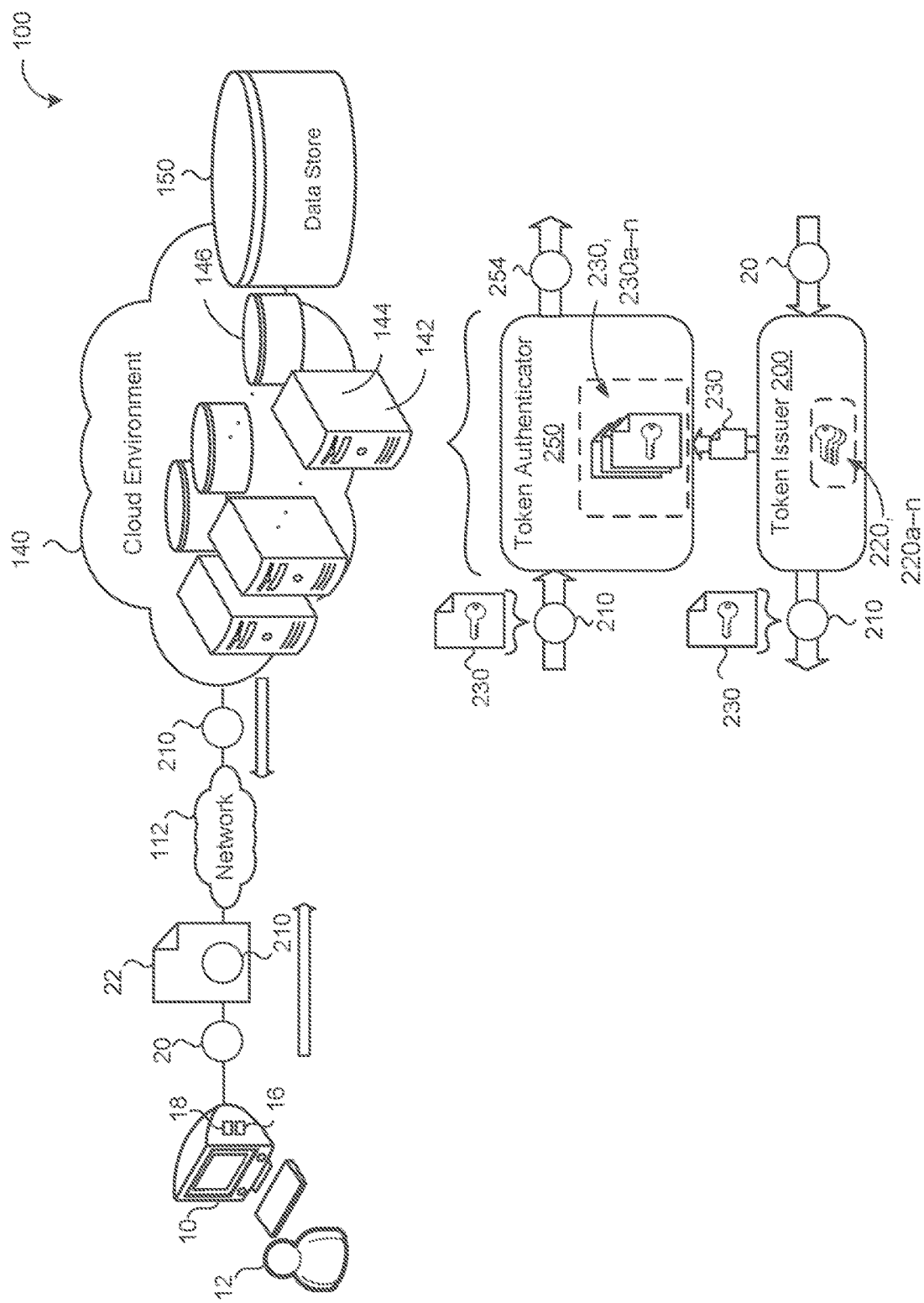
FIG. 1 is a schematic view of an example system for token expiration using signing key rotation.

Referring now to FIG. 1, in some implementations, an example system 100 includes a user device 10 (i.e., a client 10) associated with a respective user 12 in communication with a remote system 140 via a network 112. The user device 10 may correspond to any computing device, such as a desktop workstation, a laptop workstation, or a mobile device (i.e., a smart phone). The user device 10 includes computing resources 18 (e.g., data processing hardware) and/or storage resources 16 (e.g., memory hardware).

The remote system 140 may be a single computer, multiple computers, or a distributed system (e.g., a cloud environment) having scalable/elastic computing resources 142 including computing resources 144 (e.g., data processing hardware) and/or storage resources 146 (e.g., memory hardware). A data store 150 (i.e., a remote storage device) may be overlain on the storage resources 146 to allow scalable use of the storage resources 146 by one or more of the client or computing resources 144. In some implementations, the remote system 140 executes a token issuer 200.

The token issuer 200 receives authentication credentials 20 from the client 10. The authentication credentials 20 authorize the client to access one or more resources or services. For example, the resources include the data store 150 and access to some or all of the data stored therein. The data store 150 is exemplary only and the resource or service may be any restricted resource or service that requires authentication to access. The token issuer 200 authenticates the authentication credentials 20.

After successfully authenticating the authentication credentials 20, the token issuer 200 generates an authorization token 210. The authentication token 210 may also be referred to as a security token or access token. The authentication token 210 contains security and/or authentication credentials necessary to access a resource or service (such as the data store 150). To access the resource, a client 10 presents the authentication token 210 to the server or other entity that controls access to the resource. In this example, the token issuer 200 is executing on the same remote system 140 as the resource (i.e., the data store 150), however the token issuer 200 may be completely independent from the resource.

The token issuer 200 signs the authentication token 210 with a cryptographic key 220, 220a-n. The cryptographic key 220 may be symmetric or asymmetric key (i.e., a public/private key). The token issuer 200 includes a key ID 230 within the authentication token 210 that identifies the cryptographic key 220 that the token issuer 200 used to sign the authentication token 210. The token issuer 200 transmits the signed authentication token 210 to the client 10.

When the client desires to access the resource (e.g., the data store 150), the client sends an access request 22 to the remote system 140 (or whatever system/server/entity that controls access to the resource). The access request 22 includes the authentication token 210. In some examples, the remote system executes one or more token authenticators 250. It is understood that while in the example shown, the token authenticator 250 and the token issuer 200 execute within the same remote system 140, the token issuer 200 and the token authenticator 250 may instead execute on separate systems completely independent from one another. Furthermore, in some implementations, the client 10 also executes within the remote system 140 (e.g., within a virtual machine (VM) or other containerized system). The system 100 may include any number of token authenticators 250 controlling access to any number resources. The client 10 may receive one or more authentication tokens 210 to obtain access to one or more resources controlled by the token authenticators 250.

The token authenticator 250 receives the access token 210 from the client 10. As discussed in more detail below, the token authenticator 250 obtains a list of valid key IDs 230, 230a-n from the token issuer 200. The list of valid key IDs 230 includes IDs each associated with a corresponding valid cryptographic key 220 used to sign an authentication token 210. The token authenticator 250 determines whether a cryptographic key 220 used to sign the received authentication token 210 is valid based on the list of valid key IDs 230 obtained from the token issuer 200. When the cryptographic key 220 used to sign the authentication token 210 is valid, the token authenticator 250 allows the client 10 access to the resource. For example, the token authenticator 250 issues permission 254 to the remote system 140.

Figure 2A:
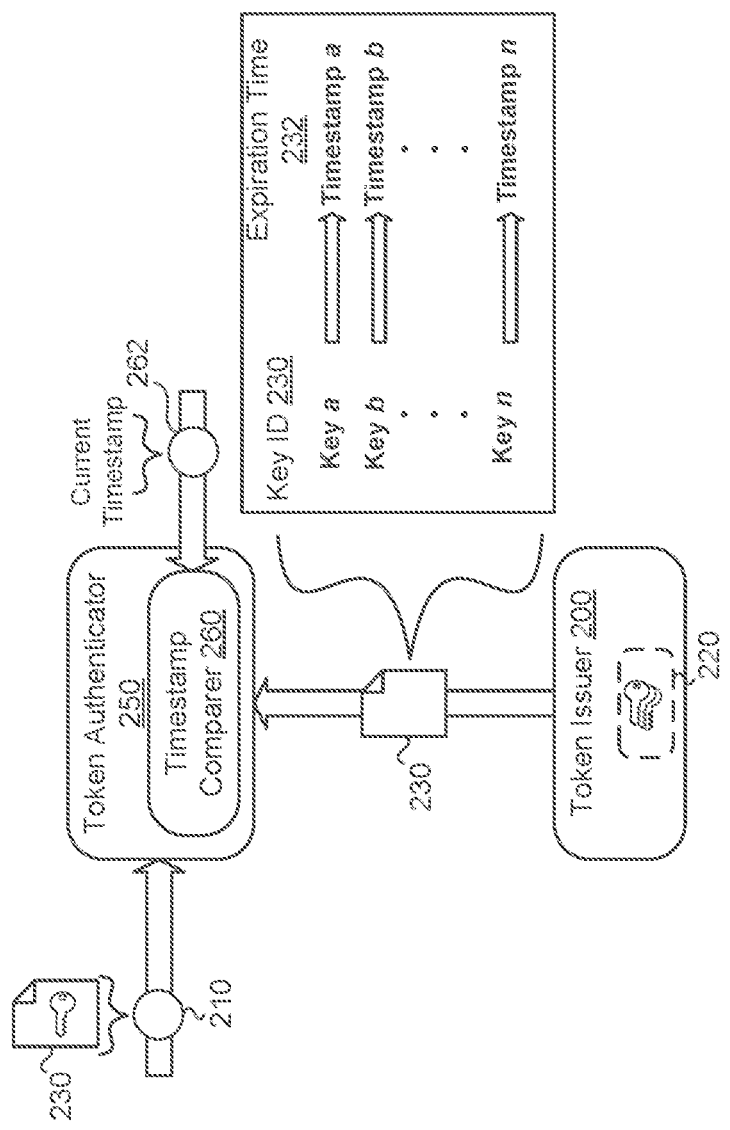
FIG. 2A is a schematic view of a token issuer providing a list of key identifications and expiration times to a token authenticator.

Referring now to FIG. 2A, in some examples, each key ID 230 in the list of valid key IDs 230 is associated with an expiration time 232. The expiration time 232 may be in the form of a timestamp. Here, the key ID 230 for key a is associated with the timestamp a, the key ID 230 for key b is associated with timestamp b, and the key ID 230 for key n is associated with timestamp n. The expiration time 232 indicates when the respective key 220 (identified by the key ID 230) will expire. When the token authenticator 250 receives an authentication token 210, the token authenticator 250 may determine whether the current time is after the expiration time 232 associated with the respective key ID 230 contained within the authentication token 210. That is, the token authenticator 250 determines whether the expiration time 232 associated with the key ID 230 has expired. For example, the token authenticator 250 includes a timestamp comparer 260 that receives a current timestamp 262 (i.e., a timestamp indicative of the current time) and compares the current timestamp 262 to the expiration time 232 associated with the key ID 230 of the authentication token 210. When the key 220 used to sign the authentication token 210 has not yet expired (i.e., the expiration time 232 is after the current time 262), the token authenticator 250 determines that the authentication token 210 is valid and grants the client 10 access to the resource.

Figure 2B:
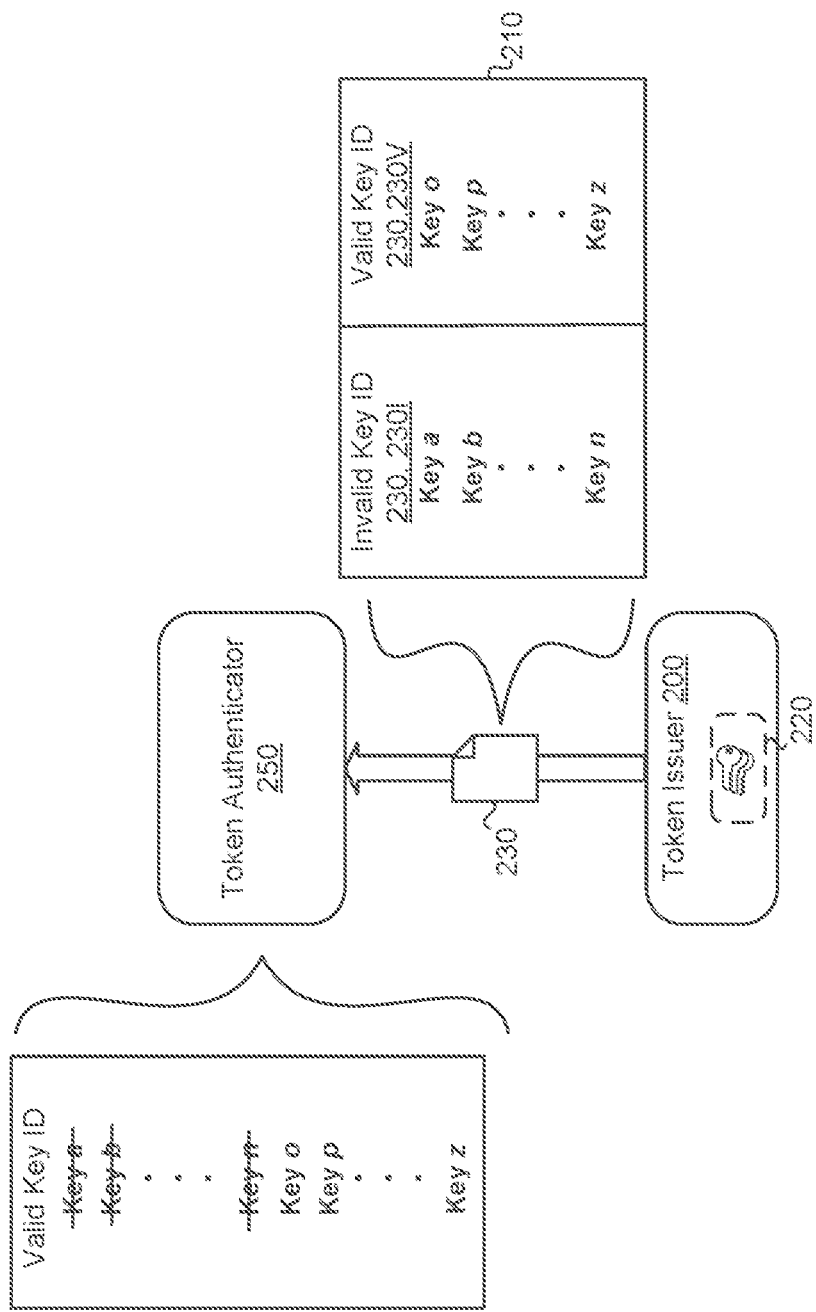
FIG. 2B is a schematic view of a token issuer providing a valid/invalid key identification list to a token authenticator.

Referring now to FIG. 2B, in some implementations, the token issuer 200 transmits, to the token authenticator 250, a list of valid and/or invalid key IDs 230, 230V, 230I. In the example shown, the token issuer 200 sends a list of key IDs 230I that are no longer valid (i.e., key a, key b, . . . , key n) and a list of key IDs 230V that are valid (i.e., key o, key p, . . . , key z). Optionally, the token authenticator 250, for each valid key ID 230V, adds the key ID 230 to the list of valid key IDs 230V. The token authenticator may remove a corresponding key ID 230 for each invalid key ID 230I received from the token issuer 200. In this case, the token authenticator 250 deletes or removes key IDs 230 for keys a-n from the list of valid key IDs 230V and adds key IDs 230 for keys o-z. Prior to receiving this list, the token authenticator 250 validates authentication tokens 210 signed with keys 220 a-n and does not validate authentication tokens 230 signed with keys 220 o-z. After receiving this list, the token authenticator 250 ceases validating authentication tokens 210 signed with keys 220 a-n, and commences to validate authentication tokens 210 signed with keys 220 o-z.

In some examples, the list received from the token issuer 200 contains only valid key IDs 230 and the token authenticator 250 removes or deletes all other key IDs 230. In other examples, the list only includes invalid key IDs 230, and the token authenticator 250 only removes the invalidated key IDs 230.

Thus, in some implementations, the token issuer 200 does not communicate expiration times of the keys 220 to the token authenticator 250 at all and instead directly communicates to the token authenticator 250 which keys are valid and invalid (via the key IDs 230). In other examples, the token issuer 200 communicates a valid/invalid key ID 230 list and an expiration time 232 for each valid key ID 230. In this example, even when the token issuer 200 fails to send a list to the token authenticator 250 that invalidates a respective key 220, the token authenticator 250 will invalidate an authentication token 210 that is signed by a key 220 after that key's respective expiration time 232. In this manner, the expiration time 232 may provide a fallback option to ensure keys 220 are expired even when communication with the token issuer 200 is lost.

In some implementations, the token issuer 200 periodically sends updates (i.e., an updated list of valid/invalid key IDs 230) to the token authenticator 250. The updates may include a publish-subscribe protocol or a remote procedure call (RPC). In some examples, each valid key ID 230 in the updated list of key IDs 230 is different than each key ID 230 in the previous list as the token issuer 200 rotates through keys 220.

Thus, in some examples, the token issuer 200 issues authentication tokens 210 that do not include a timestamp. This reduces the size of the authentication token 210. Additionally, when the token issuer 200 rotates keys 220 often (i.e., the lifespan of each key 220 is short, e.g., 3 hours or less), the key ID 230 may be encoded as an integer. For example, the key ID 230 is a one byte integer. This results in an efficient encoding of the authentication token 210.

Figure 3:
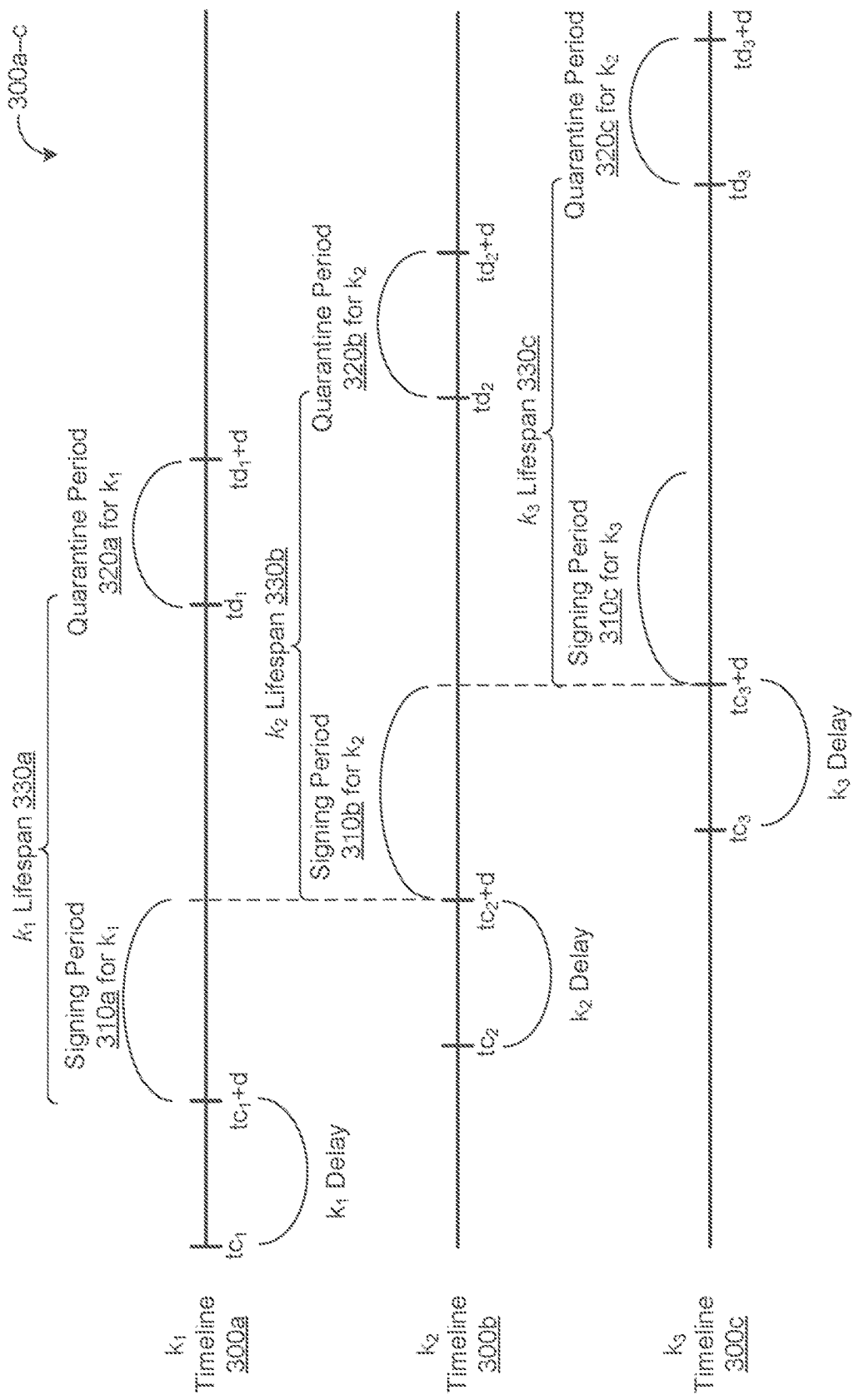
FIG. 3 is a schematic view of timelines for lifespans of keys generated by a token issuer.

Referring now to FIG. 3, exemplary timelines 300a-c for three keys $k_1$, $k_2$, $k_3$ is shown. At timeline 300a, the token issuer 200 creates or generates the key 220 $k_1$ at time $tc_1$. At this point, the token issuer 200 updates the token authenticator 250 regarding the validity of the new key $k_1$. In some examples, the token issuer 200 waits for a threshold period of time (d in this example) prior to signing authentication tokens 210 with the newly generated key 220 $k_1$. That is, in some examples, the token issuer 200 waits for a configurable d amount of time prior to signing authentication tokens 210 with a newly generated key 220. This allows time to synchronize valid key ID 230 with token authenticators 250 so that authentication tokens 210 are not wrongly rejected. The token issuer 200 signs authentication tokens 210 with the key 220 $k_1$ for a signing period 310a.

After the token issuer 200 begins signing authentication tokens 210 with key 220 $k_1$ at $tc_1+d$, the token issuer 200, at timeline 300b, generates a second key 220 $k_2$. After $tc_2+d$ amount of time has passed, the token issuer 200 begins signing authentication tokens 210 with the second key 220 $k_2$. At this point, the token issuer 200 may stop signing authentication tokens 210 with the first key 220 $k_1$. The time period 310 that the token issuer 200 uses a key 220 to sign authentication tokens 210 is configurable. The longer the period 310, the less often the token authenticator must rotate keys 220 (i.e., generate new keys 220 and update token authenticators 250 with updated key ID 230 lists). However, the shorter the period 310, the stronger the security, as authentication tokens 162 have shorter lifespans and thus are less vulnerable to attackers.

A period of time after the token issuer 200 stops signing authentication tokens 210 with the key 220 $k_1$, a quarantine period 320a begins for key 220 $k_1$. At the beginning of the quarantine period 320 (i.e., at time $td_1$ for key 220 $k_1$), the key 220 expires. That is, the token issuer 200 updates the token authenticators 250 to invalidate the key 220 and/or the expiration time 232 associated with the key 220 expires. At this point, token authenticators 250 stop validating authentication tokens 210 signed with the respective key 220 ($k_1$ in this example). For a configurable amount of time d, in some examples, the token issuer 200 will not reuse the same key 220 or key ID 230. Thus, in some examples, the token issuer 200 does not reuse the key ID 230 until after the quarantine period 320 for the respective key 220 ends. This quarantine period 320 simplifies the observability of the token authentication system 100 and reduces inconsistencies between the token issuer 200 and the token authenticators 250 regarding which key 220 is associated with a given key ID 230. Thus, a time period from $tc_1$+d to $td_1$ marks the lifespan 330a of key 220 $k_1$ (i.e., the period of time that the token authenticator 250 validates authentication tokens 210 signed by key 220 $k_1$).

In some examples, the token issuer 200, when generating a new key 220, randomly selects a key ID 230 that is not currently in use or quarantined from a pool of possible key IDs 230. For example, when the key ID 230 is encoded as a one byte integer, 256 different possible key IDs 230 exist. The token issuer 200 removes all key IDs 230 currently in use and currently in quarantine and randomly selects a key ID 230 from the remainder to associate with the new key 220.

Similarly, the key 220 $k_2$ is defined by a lifespan 330b and the token issuer 200 may refrain from reusing the key ID 230 associated with key 220 $k_2$ for the quarantine period 320b (i.e., from $td_2$ to $td_2$+d). As shown by timeline 300c, the token issuer 200 continues this pattern by generating a new key 220 $k_3$ at time $tc_3$. This key 220 also has a signing period 310c, a quarantine period 320c, and a lifespan 330c. The token issuer 200 continues to rotate keys 220 at a rate appropriate for the security level required for the system 100 and updates some or all token authenticators 250 as new keys 220 are generated and old keys 220 are deleted. In some examples, the token issuer 200 generates keys 220 for only a portion of the token authenticators 250 that receive key IDs 230 from the token issuer 200. That is, the token issuer 200 may keep multiple sets of keys 220 for different sets or groups of token authenticators 250.

Thus, the system 100 described herein does not rely on per-token timestamps to limit the lifetime of authentication tokens. Instead, tokens are validated/invalidated based on the expiration of the cryptographic key used to sign the tokens. Because the tokens typically already include a key identification that identifies the key used to sign the token, the size of the token is decreased. The lifetime of each signed authentication token is bounded by the lifetime of the key used to sign the token. A token issuer publishes a set of keys to every token authenticator using unique key identifications. The issuer may generate new keys and invalidate old keys every few minutes or hours without any significant impact on the scale of the system.

Figure 4:
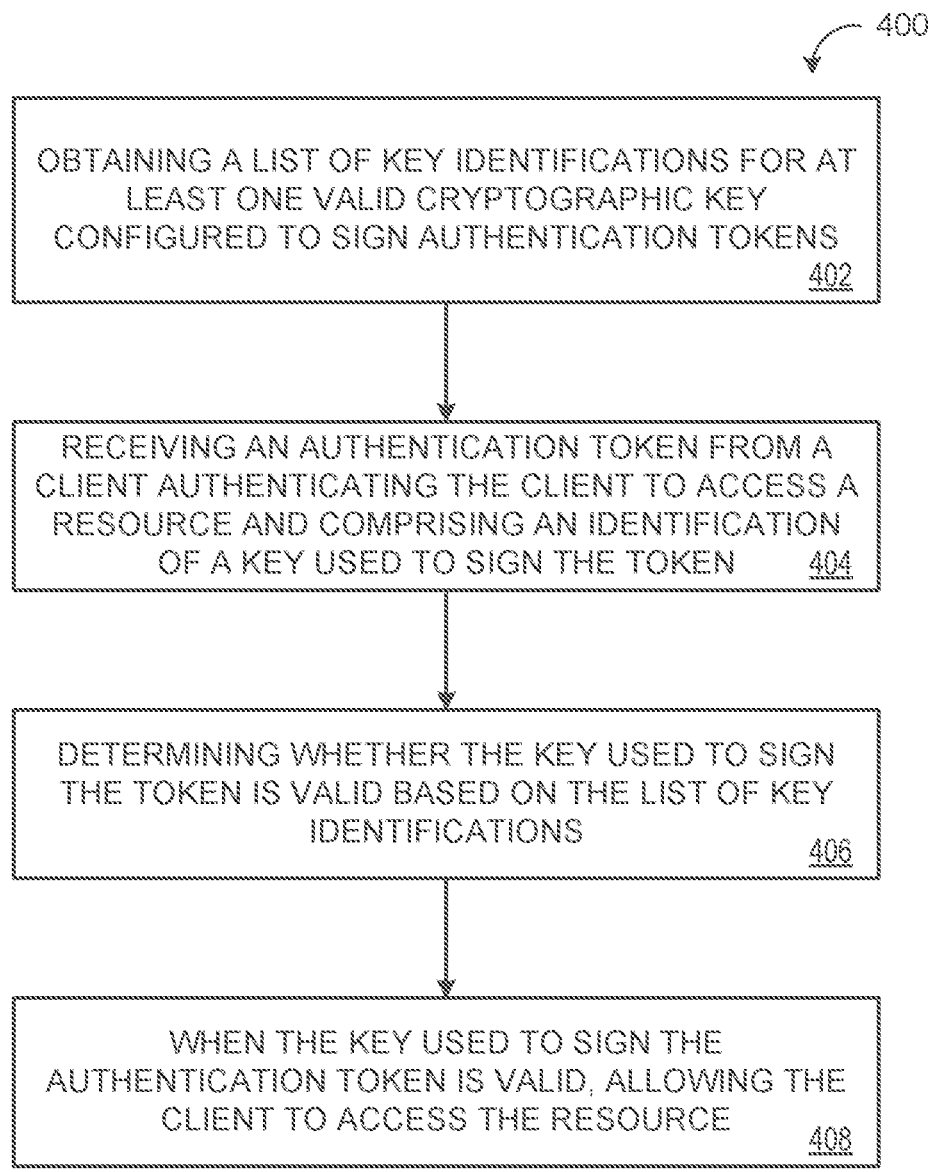
FIG. 4 is a flowchart of an example arrangement of operations for a method of token expiration using signing key rotation.

FIG. 4 is a flowchart of an exemplary arrangement of operations for a method 400 of expiring security tokens or authentication tokens using signing key rotation. The method 400 includes, at operation 402, obtaining, at data processing hardware 144, a list of key identifications (IDs) 230 for at least one valid cryptographic key 220 configured to sign authentication tokens 210. At operation 404, the method 400 includes receiving, at the data processing hardware 144, an authentication token 210 from a client 10. The authentication token 210 authenticates the client 10 to access a resource associated with the data processing hardware 144 and comprising an ID 230 of a cryptographic key 220 used to sign the authentication token 210.

At operation 406, the method 400 includes determining, by the data processing hardware 144, whether the cryptographic key 220 used to sign the authentication token 210 is valid based on the list of key IDs 230 for the at least one valid cryptographic key 220. At operation 408, when the cryptographic key 220 used to sign the authentication token 210 is valid, the method includes 400 allowing, by the data processing hardware 144, the client 10 access to the resource.

Figure 5:
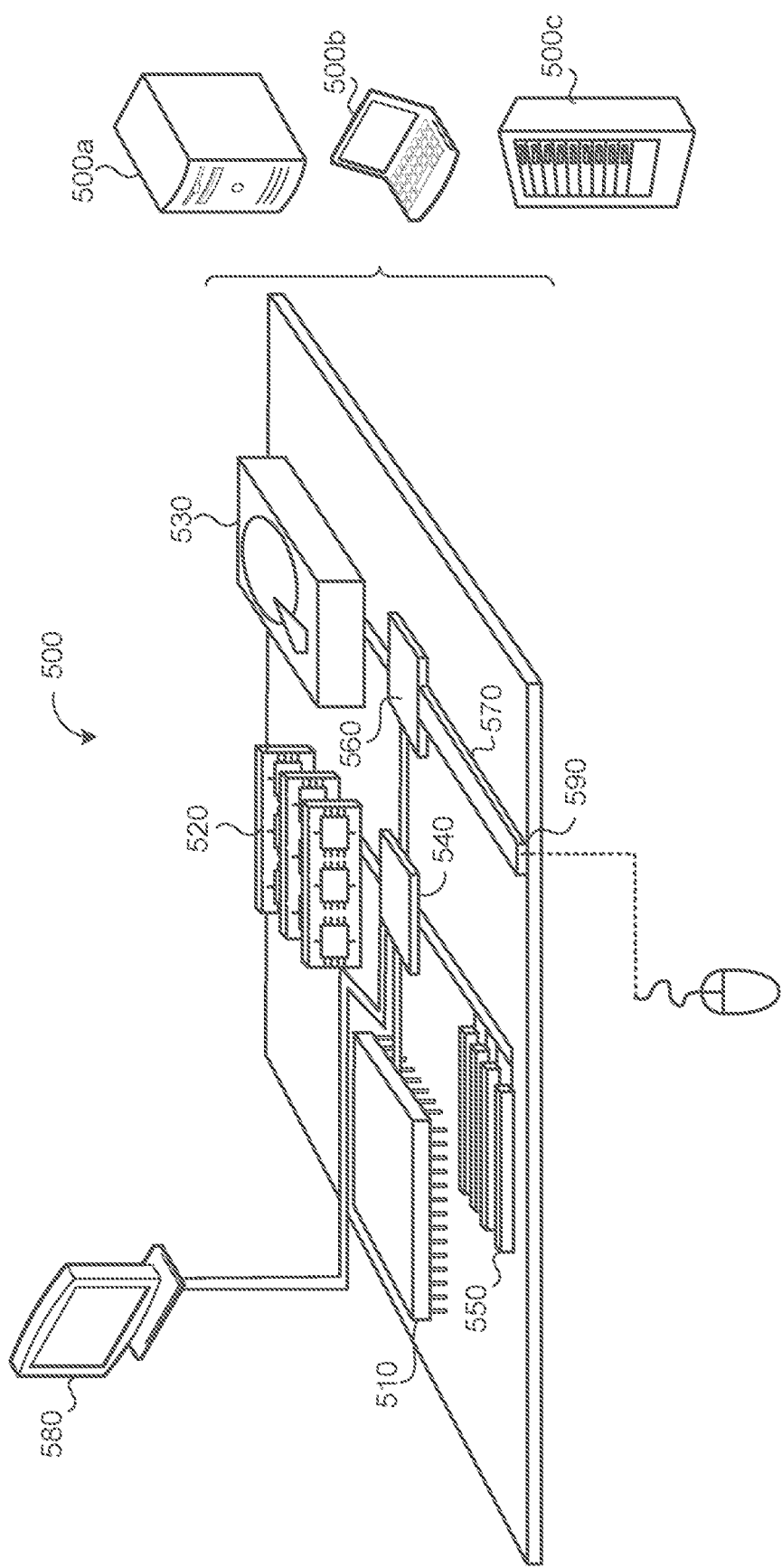
FIG. 5 is a schematic view of an example computing device that may be used to implement the systems and methods described herein.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks, magneto optical disks, and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:
1. A method comprising:
    obtaining, at data processing hardware, a list of valid key identifications (IDs), each valid key ID in the list identifying a respective cryptographic key that is valid for signing authentication tokens;
    receiving, at the data processing hardware, an authentication token from a client, the authentication token authenticating and authorizing the client to access a resource associated with the data processing hardware and comprising a key ID of a cryptographic key used to sign the authentication token;

determining, by the data processing hardware, that the cryptographic key used to sign the authentication token is valid when the key ID of the cryptographic key used to sign the authentication token is included in the list of valid key IDs;

determining, by the data processing hardware, that the cryptographic key used to sign the authentication token is invalid when the key ID of the cryptographic key used to sign the authentication token is missing from the list of valid key IDs;

when the cryptographic key used to sign the authentication token is valid:
 authenticating, by the data processing hardware, the authentication token based on the cryptographic key used to sign the authentication token; and
 allowing, by the data processing hardware, the client access to the resource; and when the cryptographic key used to sign the authentication token is invalid, rejecting, by the data processing hardware, the client access to the resource.

2. The method of claim 1, wherein obtaining the list of valid key IDs comprises:
 receiving a list of key IDs, each key ID in the list of key IDs identifying a respective cryptographic key and associated with a respective expiration time; and
 for each respective key ID in the list of key IDs:
  determining whether the respective expiration time associated with the respective key ID has expired; and
  when the respective expiration time associated with the respective key ID has not expired, determining that the respective key ID is valid.

3. The method of claim 1, wherein obtaining the list of valid key IDs comprises receiving an update from an issuer of the respective cryptographic keys identified by the list of valid key IDs.

4. The method of claim 3, wherein the update comprises a remote procedure call (RPC).

5. The method of claim 3, wherein the update comprises a publish-subscribe protocol.

6. The method of claim 1, wherein each key ID comprises an encoding of an integer.

7. The method of claim 6, wherein each integer comprises a size of one byte.

8. The method of claim 1, further comprising:
 receiving, at the data processing hardware, a list of invalid key IDs, each invalid key ID in the list identifying a respective cryptographic key that is invalid; and
 for each invalid key ID in the list of invalid key IDs, removing, by the data processing hardware, a corresponding valid key ID from the list of valid key IDs.

9. The method of claim 1, further comprising obtaining, at the data processing hardware, an updated list of valid key IDs, each key ID in the updated list of valid key IDs different than each key ID in the list of valid key IDs.

10. The method of claim 1, wherein the received authentication token does not include a timestamp.

11. A system comprising:
 data processing hardware; and
 memory hardware in communication with the data processing hardware, the memory hardware storing instructions that when executed on the data processing hardware cause the data processing hardware to perform operations comprising:
  obtaining a list of valid key identifications (IDs), each valid key ID in the list identifying a respective cryptographic key that is valid for signing authentication tokens;
  determining that the cryptographic key used to sign the authentication token is valid when the key ID of the cryptographic key used to sign the authentication token is included in the list of valid key IDs;
  receiving an authentication token from a client, the authentication token authenticating and authorizing the client to access a resource associated with the data processing hardware and comprising a key ID of a cryptographic key used to sign the authentication token;
  determining that the cryptographic key used to sign the authentication token is invalid when the key ID of the cryptographic key used to sign the authentication token is missing from the list of valid key IDs;
  when the cryptographic key used to sign the authentication token is valid:
   authenticating the authentication token based on the cryptographic key used to sign the authentication token; and
   allowing the client access to the resource; and
  when the cryptographic key used to sign the authentication token is invalid, rejecting the client access to the resource.

12. The system of claim 11, wherein obtaining the list of valid key IDs comprises:
 receiving a list of key IDs, each key ID in the list of key IDs identifying a respective cryptographic key and associated with a respective expiration time; and
 for each respective key ID in the list of key IDs:
  determining whether the respective expiration time associated with the respective key ID has expired; and
  when the respective expiration time associated with the respective key ID has not expired, determining that the respective key ID is valid.

13. The system of claim 11, wherein obtaining the list of valid key IDs comprises receiving an update from an issuer of the respective cryptographic keys identified by the list of valid key IDs.

14. The system of claim 13, wherein the update comprises a remote procedure call (RPC).

15. The system of claim 13, wherein the update comprises a publish-subscribe protocol.

16. The system of claim 11, wherein each key ID comprises an encoding of an integer.

17. The system of claim 16, wherein each integer comprises a size of one byte.

18. The system of claim 11, wherein the operations further comprise:
 receiving a list of invalid key IDs, each invalid key ID in the list identifying a respective cryptographic key that is invalid; and
 for each invalid key ID in the list of invalid key IDs, removing a corresponding valid key ID from the list of valid key IDs.

19. The system of claim 11, wherein the operations further comprise obtaining an updated list of valid key IDs, each key ID in the updated list of valid key IDs different than each key ID in the list of valid key IDs.

20. The system of claim 11, wherein the received authentication token does not include a timestamp.

* * * * *